United States Patent [19]
Kanno

[11] Patent Number: 5,929,425
[45] Date of Patent: Jul. 27, 1999

[54] PORTABLE WIRELESS OPTICAL SCANNER WITH USER INTERFACE MOUNTED ON CHARGER

[76] Inventor: Tsutomu Kanno, 1-7 Yukigaya, Otsuka-Cho, Ota-ku, Tokyo, Japan

[21] Appl. No.: 08/766,403

[22] Filed: Dec. 12, 1996

[30] Foreign Application Priority Data

Dec. 26, 1995 [JP] Japan ..................................... 7-339270

[51] Int. Cl.⁶ .................................................. G06K 7/10
[52] U.S. Cl. ................................ 235/472.01; 235/472.02; 235/462.46; 235/454
[58] Field of Search .................................... 235/472, 462, 235/454, 472.01, 472.02, 462.43, 462.44, 462.45, 462.46, 462.47

[56] References Cited

U.S. PATENT DOCUMENTS

| | | | |
|---|---|---|---|
| 4,471,218 | 9/1984 | Culp | 235/472 |
| 4,721,849 | 1/1988 | Davis et al. | 235/472 |
| 4,899,370 | 2/1990 | Kameo et al. | 379/104 |
| 4,945,216 | 7/1990 | Tanabe et al. | 235/472 |
| 5,047,615 | 9/1991 | Fukumoto et al. | 235/472 X |
| 5,465,038 | 11/1995 | Register | 235/472 |
| 5,465,207 | 11/1995 | Boatwright et al. | 701/52 |
| 5,483,144 | 1/1996 | Marek | 320/126 |
| 5,484,991 | 1/1996 | Sherman et al. | 235/472 |
| 5,587,645 | 12/1996 | Sciammarella et al. | 362/253 |
| 5,600,121 | 2/1997 | Kahn et al. | 235/472 |
| 5,602,380 | 2/1997 | Bishay | 235/472 |
| 5,665,956 | 9/1997 | La et al. | 235/472 |

*Primary Examiner*—Michael G. Lee
*Attorney, Agent, or Firm*—Brinks Hofer Gilson & Lione

[57] ABSTRACT

A timer operates when a barcode reader is lifted from a charger and a charger terminal is isolated from the charger and a communication control means transmits an application acknowledgment signal to the fixed unit via a light receiving means when a barcode indicating the ID number of a user is read within the predetermined time after operation of the timer. A check means of the fixed unit watches detection of reception of the application acknowledgment signal by a communication control means and drives an alarm means when such signal is not received within the predetermined time after the timer has operated, while lights a communicating condition display lamp of the charger for each reception of the application acknowledgment signal and each subsequent communication. Accordingly, the fixed unit can be connected easily to a host computer and can easily select its installation area, while the charger can be set to the area near a user. Communication can be confirmed from both handy unit and the charger.

4 Claims, 5 Drawing Sheets

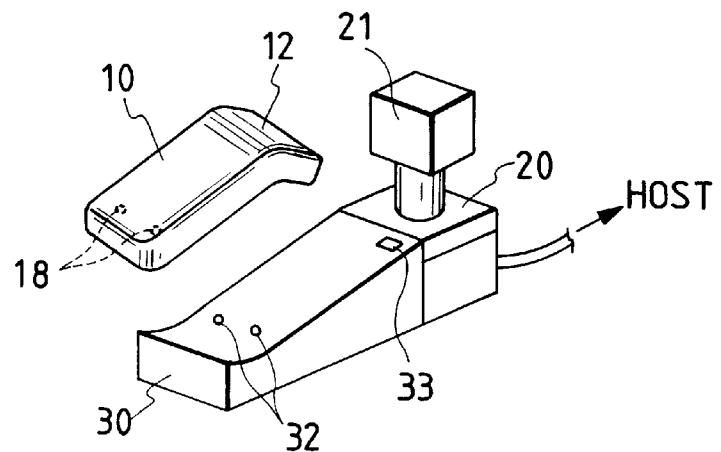
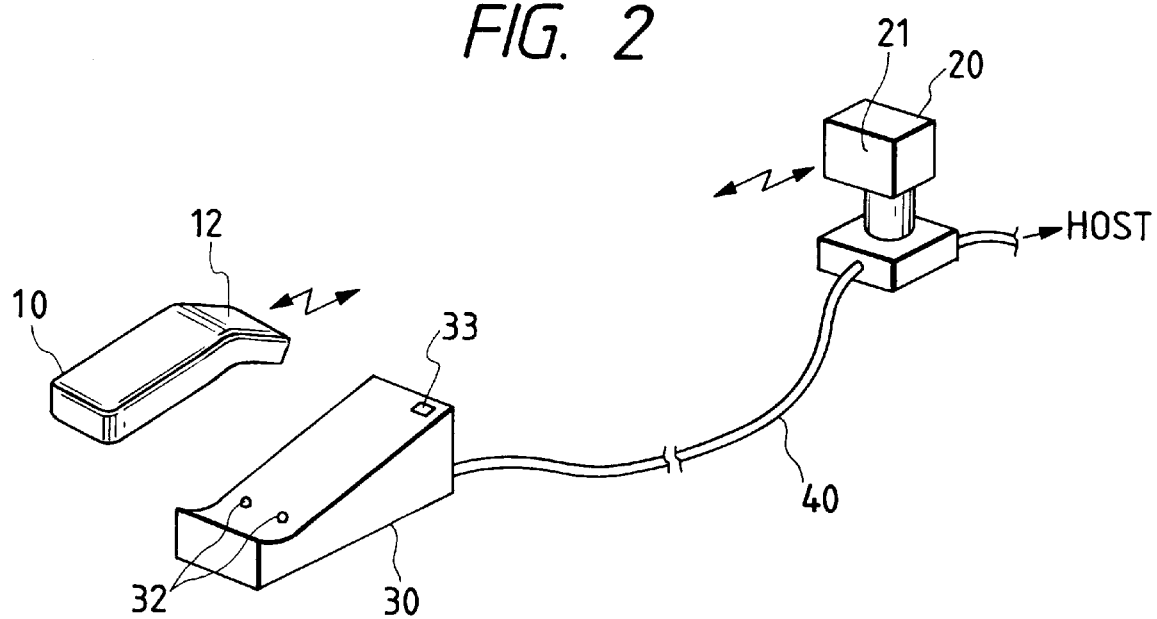

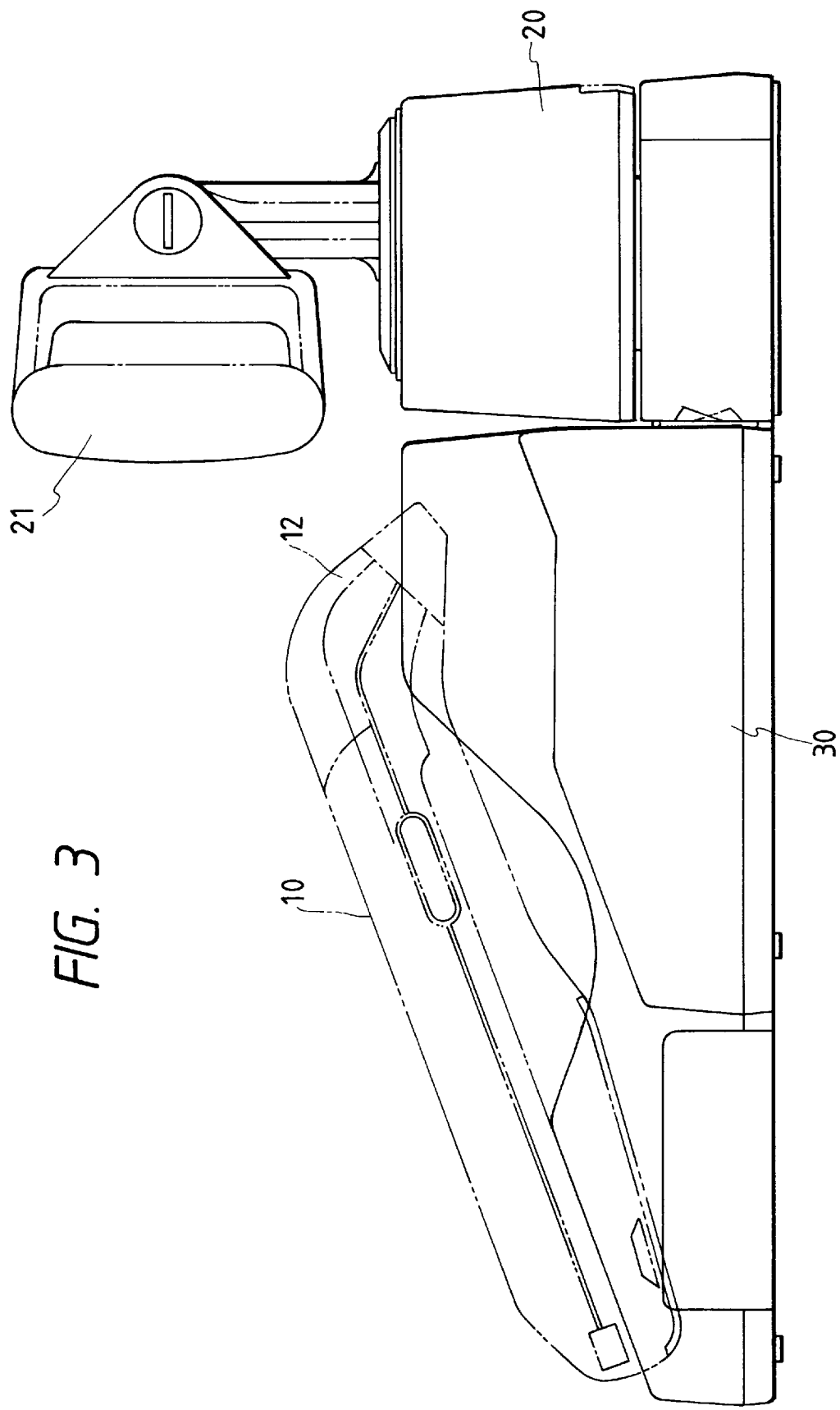

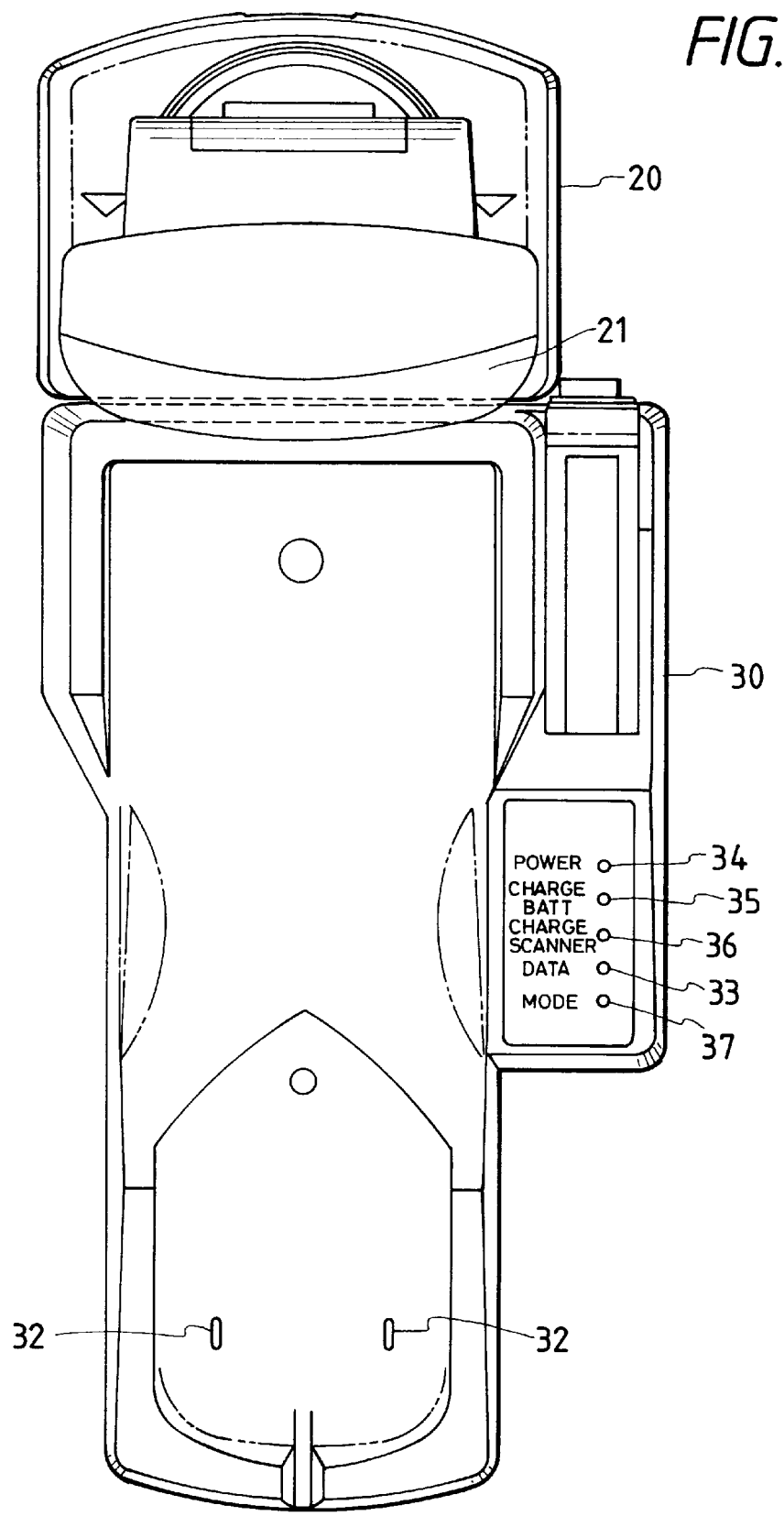

PORTABLE WIRELESS OPTICAL SCANNER WITH USER INTERFACE MOUNTED ON CHARGER

BACKGROUND OF THE INVENTION

1. Field of the Invention

The present invention relates to an optical wireless apparatus to implement optical communication between a portable unit like, for example, a wireless barcode reader terminal and a fixed unit.

2. Description of the Related Art

As a wireless apparatus of the related art, a wireless system or wireless LAN (a) consisting of a handy terminal (portable unit) and a fixed unit is popular. Moreover, in the system utilizing optical communication line, a light transmitting and a light receiving means of the fixed unit are fixed at a ceiling or a wall and the fixed unit is connected with wire to a host computer. Moreover, the handy terminal as the portable unit is usually used near the fixed unit and it can be charged with a charger when it is not operated.

As a system of the related art, for example, a system to transmit the data read with a barcode reader to a fixed unit is described in the official gazettes of the Japanese Patents laid-open Nos. 143191/1987, 211476/1989 and (b) 213989/1990. Particularly, the related art (b) proposes a method for integrating the charger and the light transmitting and light receiving means of the fixed unit.

Here, the wireless apparatus of this type is accompanied by the following needs.

(1) The light transmitting/receiving means in the fixed unit side is required to be installed at the area assuring easier connection to a host computer. However, since it is necessary that there is no restriction on the area from making communication with a portable unit, it will be better that the installation area of the fixed unit can be changed freely depending on the installation conditions.

(2) The charger should preferably be installed near the application field, namely, near a user because if a user can charge the charger within a short interval, the user can use the charger without paying attention to its continuous application time of the portable unit.

(3) It is naturally required for the portable unit side to be able to confirm that the communication with the fixed unit is enabled, but it will be better to be able to make such confirmation from the charger side (assuring higher reliability).

However, in the related art (a), since the portable unit is used near the fixed unit and it is set to the charger for charging when it is not operated, the related art (a) satisfies the requirement (2) but the requirement (3) because the fixed unit cannot confirm the communication with the handy unit. Moreover, the light transmitting/receiving means of the fixed unit in the related art is fixed and naturally cannot satisfy the needs (1) and (3).

In the related art (b), moreover, since the charger and the light transmitting/receiving means of the fixed station are integrated, then charger/fixed unit provided near a user can satisfy the needs (2) and (3) but not the need (1).

SUMMARY OF THE INVENTION

It is a first object of the present invention to provide an optical wireless apparatus which ensures that the fixed unit side can easily be connected to a host computer and can freely change its installation area, while a charger can be installed near a user and also assures improvement in reliability by confirming the communication from both the handy unit and charger.

It is a second object of the present invention to provide an optical wireless apparatus wherein the fixed unit checks whether the predetermined procedures are performed or not when the handy unit is lifted from the charger and issues, if the check result of the checking means is defective, an effective alarm for watching of unit to protect from robbery.

In order to achieve the objects explained above, there is provided an optical wireless apparatus comprising: a handy unit and a fixed unit for making optical wireless communication therebetween, and a charger for charging the handy unit, the fixed unit further having a transmitting means for sending by wire condition of the communication with the handy unit to the charger; and the charger having a communicating condition informing means for informing the condition of communication between the handy unit and fixed unit transmitted from the transmitting means to a user.

With the structure explained previously, the light transmitting/receiving means in the fixed unit can easily be connected to the host computer and also can freely change its provision area, while the charger can be disposed near the application area of the user, enabling confirmation of communication from both handy unit and charger.

Moreover, the fixed unit comprises a check means for checking whether the predetermined procedures are performed or not when the handy unit is lifted from the charger and at least one of the handy unit, fixed unit and charger has an alarm unit to issue an alarm if the check result of the check means is defective. Thereby, it is checked whether the predetermined procedures have been performed or not when the handy unit is lifted from the charger and an alarm is issued if the check result of the check means is defective to watch the unit for protection from robbery.

In addition, the handy unit transmits a barcode information read by the barcode reader to the fixed unit.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a perspective view showing a profile of one embodiment of an optical wireless apparatus of the present invention;

FIG. 2 is a perspective view showing cable connection between the charger and the fixed unit isolated from each other as shown in FIG. 1;

FIG. 3 is a right side view showing an optical wireless apparatus of FIG. 1 and FIG. 2;

FIG. 4 is a plan view showing an optical wireless apparatus of FIG. 1 and FIG. 2;

DETAILED DESCRIPTION OF PREFERRED EMBODIMENT

A preferred embodiment of the present invention will be explained with reference to the accompanying drawings.

Figure 6:
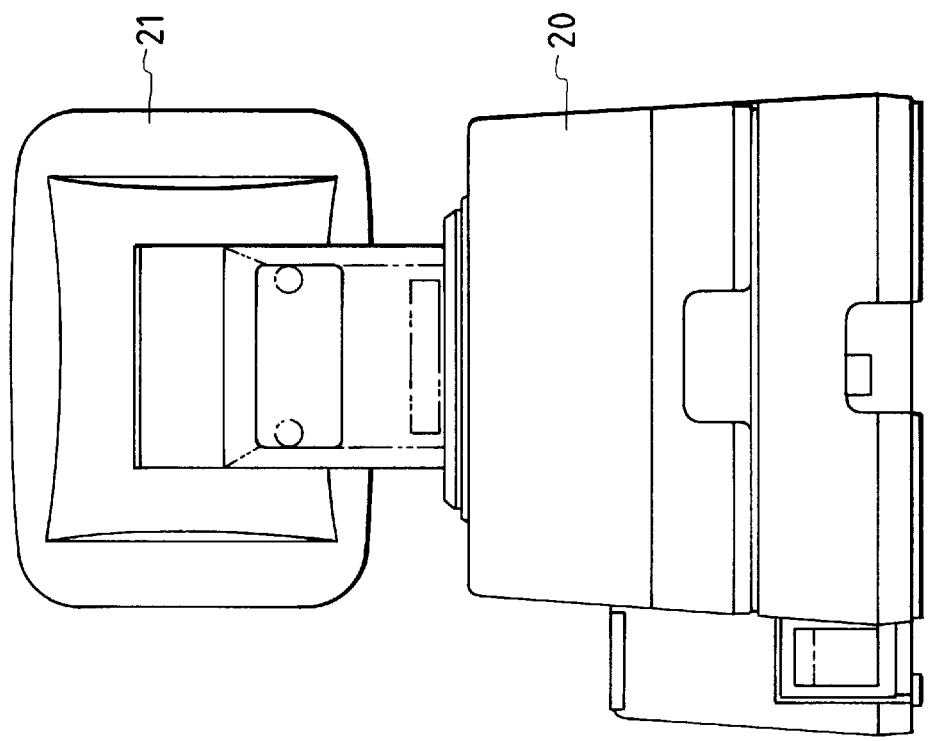
FIG. 6 is a rear elevation showing an optical wireless apparatus of FIG. 1 and FIG. 2.
Figure 5:
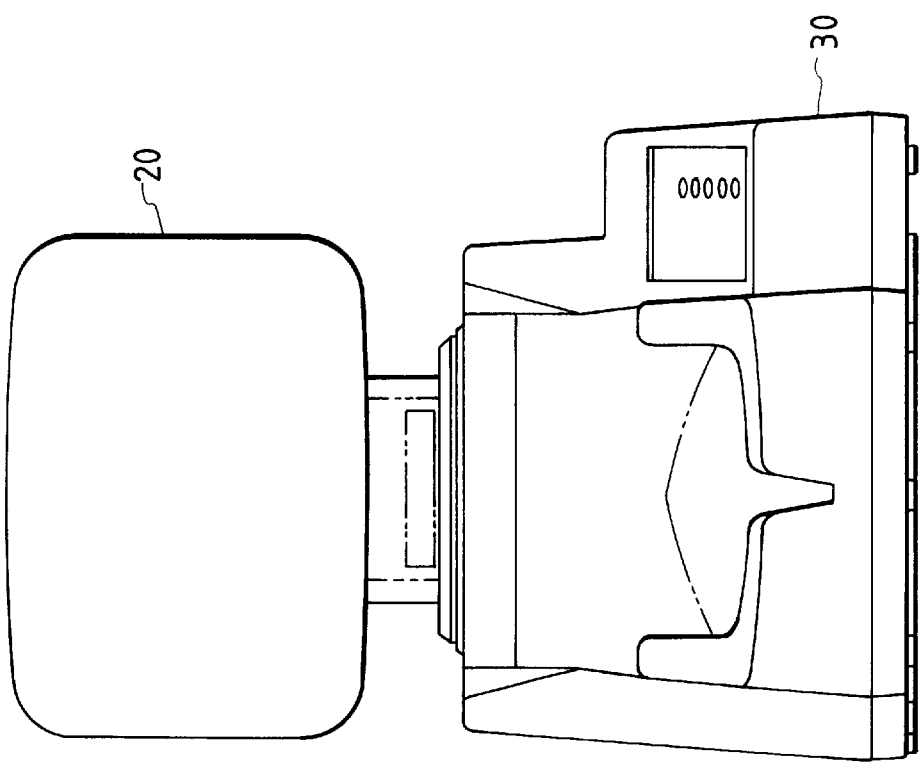
FIG. 5 is a front elevation showing an optical wireless apparatus of FIG. 1 and FIG. 2.
Figure 7:
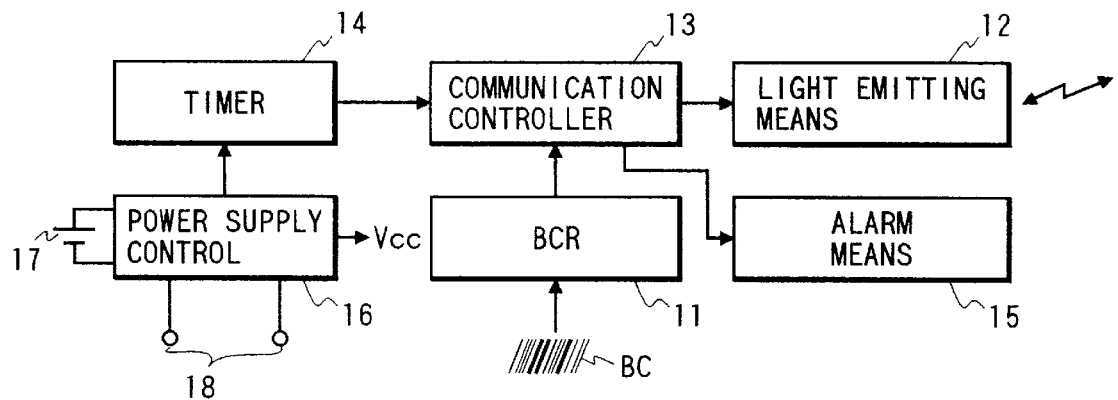
FIG. 7 is a block diagram showing a barcode reader.

As shown in FIG. 1 to FIG. 5, an optical wireless apparatus of the present invention is schematically composed of a barcode reader (BCR) 10 provided as a handy unit, a fixed unit 20, a charger 30 and a host computer not illustrated. The barcode reader 10 and fixed unit 20 makes optical wireless communications and the fixed unit 20, charger 30 and host computer make communications through the wiring. The charger 30 charges a battery 17 (as shown in FIG. 7) of the barcode reader 10 and is provided with a communicating condition display lamp 33 which lights when communication is conducted between the barcode reader 10 and fixed unit 20.

The charger 30 is also provided, as shown in FIG. 4, with a power source (POWER) lamp 34, a charging (CHARGE BATT) display lamp 35, a charging condition (CHARGE SCANNER) display lamp 36 and a mode (MODE) display lamp 37, in addition to the communicating condition (DATA) display lamp 33. Such fixed unit 20 and charger 30 can be connected in the closely disposed condition as shown in FIG. 1 and moreover connected in the isolated condition via the cable 40 as shown in FIG. 2.

As shown in FIGS. 2, 7–9 the barcode reader 10 comprises a barcode reading means 11 for reading a barcode BC, a light transmitting means 12 for making communication with the fixed unit 20, a communication controlling means 13 for controlling optical communication, a timer 14, an alarm means 15 and a power supply control means 16. The power supply control means 16 charges a battery 17 with the power supplied from the charger 30 via a charging terminal 18 and generates the power supply voltage Vcc to supply to each block 11 to 15.

Moreover, when the barcode reader 10 is lifted from the charger 30 and whereby the charging terminal 18 is isolated from the charger 30, the timer 14 operates and the communication control means 13 transmits, after the timer 14 starts to operate, an application acknowledgment signal to the fixed unit 20 via the light receiving means 12 when the barcode BC indicating a user ID is read within the predetermined period. If such barcode BC cannot be read, the communication control means 13 drives an alarm unit 15. The communication control means 13 also transmits, after transmission of the application acknowledgment signal, the barcode information read by the barcode reader 11 to the fixed unit 20.

Figure 8:
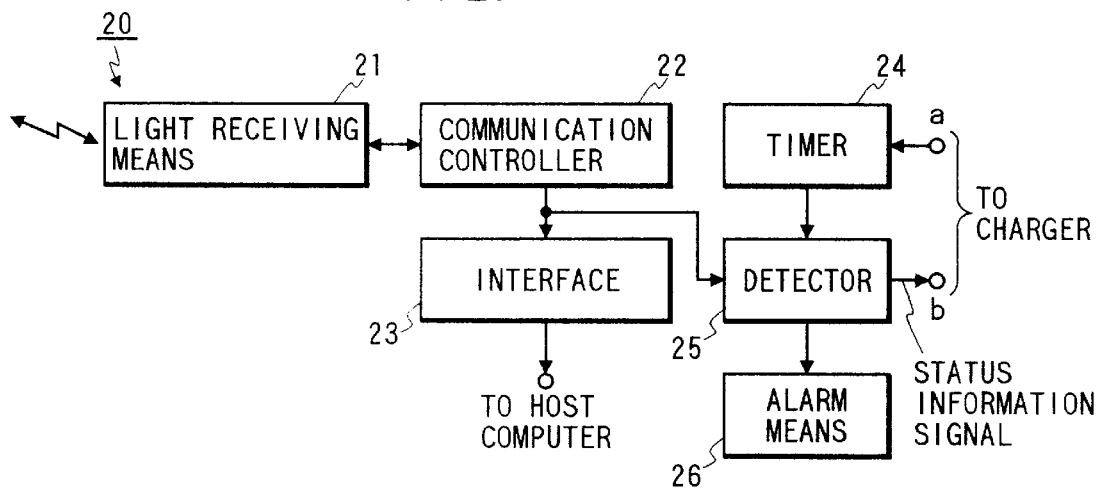
FIG. 8 is a block diagram showing a fixed unit.
Figure 9:
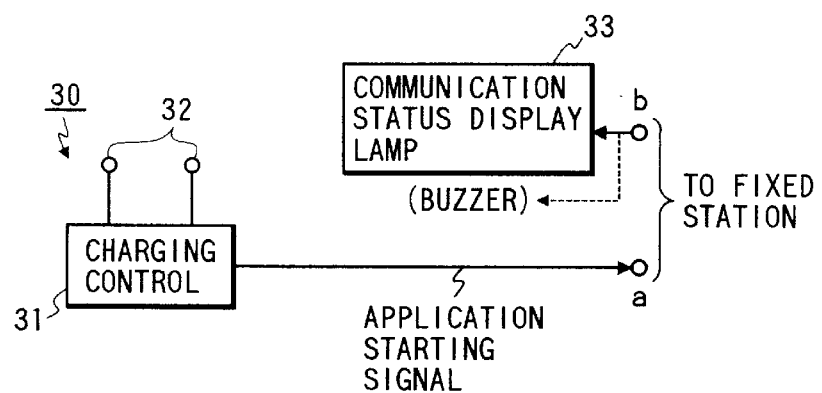
FIG. 9 is a block diagram showing a charger.

The fixed unit 20 comprises, as shown in FIG. 8, a light receiving means 21 for making communication with the barcode reader 10 (as shown in FIG. 2), a communication control means 22 for controlling optical communication, an interface 23 for transmitting the barcode information from the barcode reader 10 to the host computer, a timer 24, a check means 25 and an alarm unit 26. The timer 24 is connected to the charger 30 via a connecting terminal a, while the check means 25 via a connecting terminal b.

The charger 30 has a charging control means 31 for generating a DC power source of the barcode reader 10 from the commercial power supply and supplying this power source via the charging terminal 32 and a communicating condition display lamp 33. The charging control means 31 is connected to the timer 24 of the fixed unit 20 via the connecting terminal a, while the communicating condition display lamp 33 is connected to the check means 25 of the fixed unit 20 via the connecting terminal b. The communicating condition display lamp 33 may be replaced with a buzzer.

The charging control means 31 sends, when the barcode reader 10 is lifted from the charger 30 and the charging terminal 18 is isolated from the charger 30, the application starting signal to the timer 24 of the fixed unit 20 via the connecting terminal a and the timer 24 starts operation upon reception of the application start signal. The check means 25 monitors the reception and detection of the application acknowledgment signal by the communication control means 22 and drives the alarm means 25 if the signal is not received within the predetermined period after the timer 24 has started operation. Meanwhile, the check means 25 also lights the communicating condition display lamp 33 of the charger 30 for each reception of the application acknowledgment signal and each subsequent communication.

In the profile of the above embodiment, the barcode BC is read to ensure the security by preventing robbery of the barcode reader 10, but it is also possible to provide a ten-key on the barcode reader 10 or charger 30 for inputting the ID number through this ten-key.

Since the fixed unit can be set in the area assuring easy connection with the host computer and is not frequently moved in the profile of such embodiment, connection reliability is never lost. If the fixed unit is required to be used in the isolated area, it can be connected easily with the charger with a cable and only the charger may be placed in the near area. Moreover, since the charger is provided with the communicating condition informing means, whether communication can be made accurately or not can be confirmed with higher reliability. In addition, since it is enough when communication can be made with a cable, the cable may be simplified and does not require high electrical characteristics.

Although preferred embodiment of the present invention have been described and illustrated, it will be apparent to those skilled in the art that various modifications may be made without departing from the principles of the invention.

What is claimed is:

1. An optical wireless apparatus comprising:

a handy unit and a fixed unit for making optical wireless communication therebetween; and a charger for charging said handy unit, said charger can be moved together with said handy unit;

said fixed unit further having a transmitter for sending by wire a condition of the communications with said handy unit to said charger and a wired interface with an external host computer;

said charger having a communicating condition informer for informing the condition of communication between said handy unit and said fixed unit transmitted from said transmitter to a user; and whereby said charger and said fixed unit are not integral units.

2. An optical wireless apparatus as set forth in claim 1, wherein said fixed unit has a checking element that determines whether an appropriate user has lifted the handy unit and the checking element outputting a signal indicating a result of the check at least one of said handy unit, fixed unit and charger has an alarm for issuing an alarm when said result of a check indicates a non-appropriate user.

3. An optical wireless apparatus as set forth in claim 2, wherein said handy unit transmits the barcode information read by the handy unit to said fixed unit.

4. An optical wireless apparatus as set forth in claim 1 wherein said handy unit transmits the barcode information read by the handy unit to said fixed unit.

* * * * *

UNITED STATES PATENT AND TRADEMARK OFFICE
CERTIFICATE OF CORRECTION

PATENT NO. : 5,929,425
DATED : July 27, 1999
INVENTOR(S) : Tsutomu Kanno

It is certified that error appears in the above-identified patent and that said Letters Patent is hereby corrected as shown below:

In column 2, line 11, under "ABSTRACT", change "while" to --which--.

<u>In the Claims</u>

In claim 1, line 9, after "computer;" add --and--.

In claim 1, line 15, change "units" to --unit--.

In claim 2, line 5, after "check" insert --to--.

Signed and Sealed this

Twenty-eighth Day of March, 2000

Q. TODD DICKINSON

*Attest:*

*Attesting Officer*   *Commissioner of Patents and Trademarks*